United States Patent [19]
Gaussa, Jr. et al.

[11] Patent Number: 5,568,528
[45] Date of Patent: Oct. 22, 1996

[54] METHOD AND SYSTEM FOR COMPENSATING A ROD POSITION INDICATION SYSTEM FOR NON-LINEARITY

[75] Inventors: Louis W. Gaussa, Jr., Penn Township; Arun P. Sahasrabudhe, West Mifflin, both of Pa.

[73] Assignee: Westinghouse Electric Corporation, Pittsburgh, Pa.

[21] Appl. No.: 342,474

[22] Filed: Nov. 21, 1994

[51] Int. Cl.$^6$ ............................................. G21C 17/00
[52] U.S. Cl. ........................ 376/258; 376/220; 376/226; 376/259
[58] Field of Search ................................ 376/258, 250, 376/220, 222, 259; 73/313, 314; 340/870.12, 870.26, 870.36

[56] References Cited

U.S. PATENT DOCUMENTS

| 3,591,733 | 7/1971 | Pflughaupt | 179/100.2 |
| 3,701,007 | 10/1972 | Schad et al. | 324/43 R |
| 3,742,409 | 6/1973 | Santis et al. | 336/45 |
| 3,846,771 | 11/1974 | Young et al. | 340/195 |
| 3,852,661 | 12/1974 | Szabb et al. | 324/34 |
| 3,919,043 | 11/1975 | Reid | 376/258 |
| 4,250,490 | 2/1981 | Dahlke | 340/870.37 |
| 4,631,537 | 12/1986 | Neuner et al. | 340/870.17 |
| 4,714,926 | 12/1987 | Neuner et al. | 340/870.36 |

Primary Examiner—Charles T. Jordan
Assistant Examiner—Meena Chelliah
Attorney, Agent, or Firm—J. C. Spadacene

[57] ABSTRACT

A method for compensating a rod position indication system for non-linearity comprises the steps of applying an excitation current to a primary of a sensor for inducing a generally linear voltage that is representative of the position of a control rod on a secondary of the sensor. The excitation current includes a first frequency which is sufficient to provide the generally linear output for the sensor. The excitation current is then modified to include a second frequency which is sufficient for providing the generally linear output when the first frequency is insufficient to provide the generally linear output.

8 Claims, 3 Drawing Sheets

METHOD AND SYSTEM FOR COMPENSATING A ROD POSITION INDICATION SYSTEM FOR NON-LINEARITY

BACKGROUND OF THE INVENTION

1. Field of the Invention

The present invention relates generally to compensation of a rod position indication system of a nuclear reactor vessel which system includes a linear variable differential transformer (LVDT) having a generally linear output that is representative of the position of a control rod and, more particularly, to compensating such a rod position indication system for any non-linearity in the LVDT output.

2. Description of the Related Art

In a commercial nuclear reactor, heat, from which steam and ultimately electricity are generated, is produced by fissioning of a fissible material such as enriched uranium. This fissible material, or nuclear fuel, is typically contained within a nuclear core made up of a multiplicity of fuel rods supported in a plurality of nuclear fuel assemblies, coextensively arranged in a spaced parallel array.

Movable control rods are dispersed throughout the core to control the fission process. The control rods generally comprise a plurality of elongated rods containing neutron absorbing materials which fit in longitudinal openings defined in the fuel assemblies and among the fuel rods by guide thimbles of the fuel assemblies. The guide thimbles thus guide the control rods during their movement into and out of the core. Inserting a control rod into the core adds more absorber material and, hence, decreases the nuclear reaction; conversely, withdrawing a control rod removes absorber material and, hence, increases a nuclear reaction and thereby the power output of the core. The nuclear reactor core and the control rods are positioned within and supported by a reactor vessel through which a reactor coolant flows.

The control rods are supported in cluster assemblies moved into and from the nuclear core by control rod drive mechanisms which, in turn, are mounted by an upper internals arrangement located within the nuclear reactor vessel above the nuclear core. Typically, a reactor pressure vessel is pressurized to a relatively high internal pressure. The control rod drive mechanisms operate within the same pressure environment that exists within the reactor pressure vessel. Hence, the control rod drive mechanisms are housed within pressure housings of the upper internals arrangement which are tubular extensions of the reactor pressure vessel.

One of the more commonly used types of control rod drive mechanisms is referred to as a "magnetic jack." With this type of mechanism, the control rods are jacked into and from the nuclear core in a series of motions each involving moving the control rod a discrete incremental distance or "step;" hence, such movement is commonly referred to as stepping of the control rods. There are typically 231 steps between the fully withdrawn position and the fully inserted position of the control rods. For example, 0 steps indicate the fully inserted position, and 231 steps indicate the fully withdrawn position. This type of mechanism is illustrated and described in U.S. Pat. Nos. to Frisch (3,158,766) and Dewesse (3,992,255) which are assigned to the assignee of the present invention.

This magnetic jack type of control rod drive mechanism includes three electromagnetic coils and armatures or plungers which are operated to raise and lower a drive rod shaft and thereby the control rod cluster assembly. The three coils are mounted about and outside of the pressure housing. Two of the coils actuate respective plungers of movable and stationary grippers contained within the housing. The third coil actuates a lift plunger connected to the movable gripper. Actuation of the movable and stationary plungers, in turn, operate sets of circumferentially spaced latches which grip the drive rod shaft having multiple axially-spaced circumferential grooves. The stationary gripper latches are actuated to hold the drive shaft in a desired axial position. The movable gripper latches are actuated to raise and lower the drive rod shaft. Each jacking or stepping movement of the control rod drive mechanism moves the drive rod shaft 5/8 inch (1.58 cm) The jacking or stepping movement is thus accomplished by the operation of the three sets of axially spaced electromagnetic coils to actuate the corresponding stationary, movable and lift plungers so as to alternately and sequentially grip, move and release the control rod drive shaft of the respective mechanism.

A number of indicators have been used in the past to determine control rod position. One such indicator is an analog indicator. This analog indicator includes a plurality of layered, wound coils concentrically arranged in a stack and supported by a nonmagnetic stainless steel tubular substructure that is slid over a nonmagnetic rod travel housing. The coils are arranged alternately as primary and secondary coils, with all the primary coils connected in series and all the secondary coils connected in series. The coils form, in effect, a long linear voltage transformer distributed over the height of the travel housing such that the coupling from primary to secondary is affected by the extent to which the magnetic drive rod penetrates the coil stack. Rod position is determined by applying a constant sinusoidal excitation current to the primary and measuring the voltage induced across the secondary. The magnitude of the induced secondary voltage corresponds to rod position. The secondary output voltage varies substantially linearly with the position of control rod, as is well known in the art. This secondary voltage is processed by instrumentation, which is well known in the art, and displayed on a control panel.

Although the present device for detecting control rod position is satisfactory, it is not without drawbacks. When the control rods are near the fully withdrawn position (i.e., 231 steps), the output of the transformer varies substantially non-linearly with the position of the control rods, which obviously creates an error in the indication of the position of the control rod.

Consequently, a need exists for a method and apparatus for compensating a rod position indication system for non-linearity when the control rods are substantially withdrawn.

SUMMARY OF THE INVENTION

The present invention provides an improvement designed to satisfy the aforementioned needs. Particularly, the present invention is directed to a method for compensating a rod position indication system for non-linearity comprising the steps of (a) applying an excitation current to a primary of a sensor for inducing a generally linear voltage that is representative of the position of a control rod on a secondary of the sensor, wherein the excitation current includes a first frequency sufficient to provide the generally linear output; and (b) modifying the excitation current to include a second frequency sufficient for providing the generally linear output when the first frequency is insufficient to provide the generally linear output.

It is an object of the present invention to provide a method for compensating a rod position indication system for non-linearity.

It is a feature of the present invention to provide a current source having a 60 cycle frequency for exciting the sensor over a predetermined range of rod positions, and having a 20 cycle frequency for exciting the sensor over the remaining range of control rod positions.

BRIEF DESCRIPTION OF THE DRAWINGS

In the course of the following detailed description, reference will be made to the attached drawings in which.

DESCRIPTION OF THE PREFERRED EMBODIMENT

Figure 1:
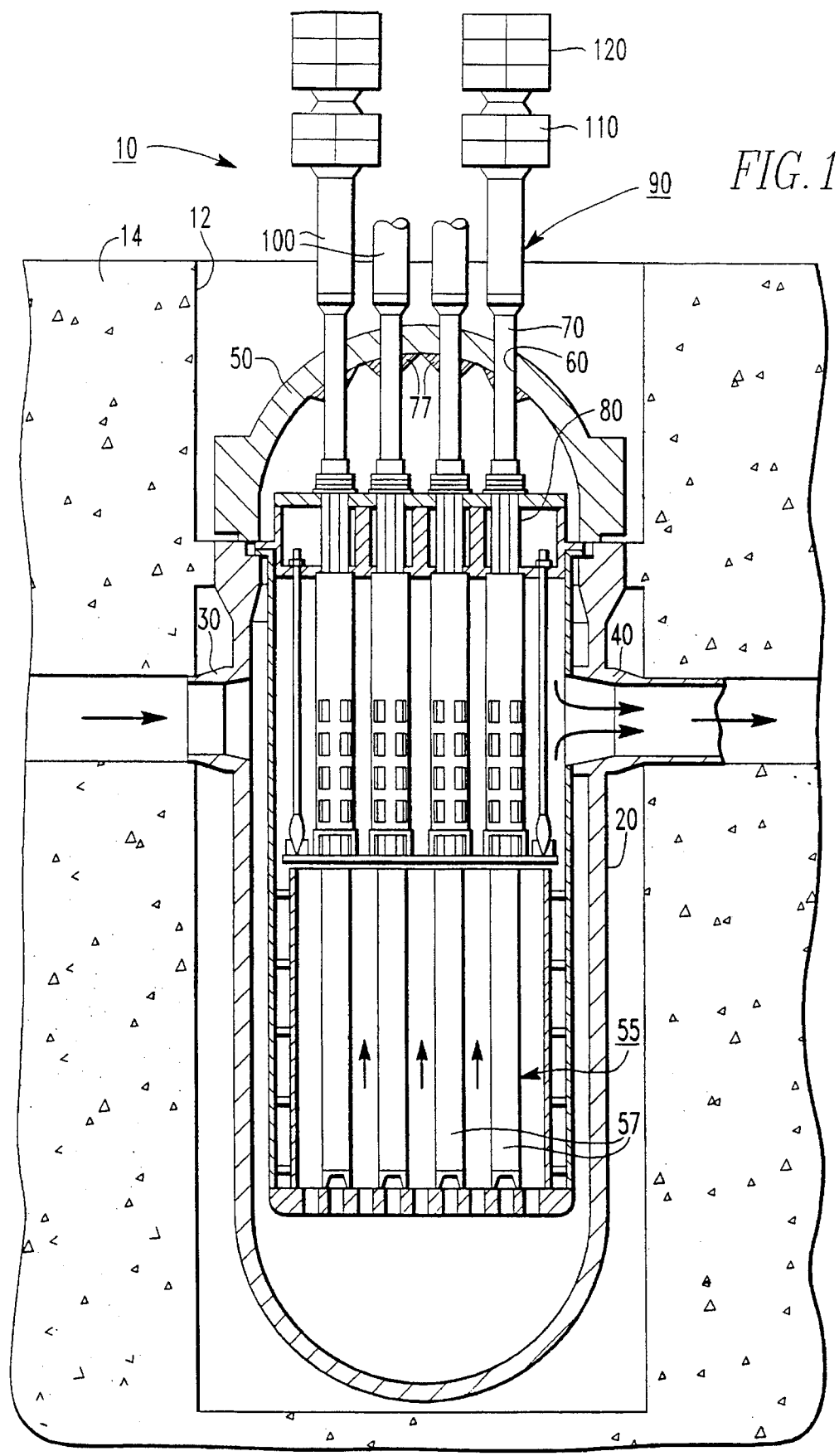
FIG. 1 illustrates a view in vertical cross section of a typical nuclear power plant reactor vessel and its rod position indicator.

In the following description, like reference characters designate like or corresponding parts throughout the several views of the drawings. Also, in the following description, it is to be understood that such terms as "forward," "left," "right," "upwardly," "downwardly," and words of similar import are words of convenience and are not to be construed as limiting terms.

Referring now to the drawings, and particularly to FIG. 1, there is shown a typical nuclear power reactor vessel, generally referred to as 10, for producing heat by a controlled fission of a fissionable material (not shown). The reactor vessel 10 is disposed in a reactor cavity 12 defined by a containment building 14. The reactor vessel 10 includes a cylindrically shaped bottom 20 open at its top end and having a plurality of inlet nozzles 30 and outlet nozzles 40 attached to the upper portion thereof (only one of each nozzle is shown). A flanged, hemispherically shaped reactor vessel closure head 50, which may be carbon steel, is mounted atop the bottom 20 and is sealingly attached to the open top end of the bottom 20 so that the closure head 50 sealingly caps the bottom 20. Capping the bottom 20 in this manner allows for suitable pressurization of the coolant (not shown) circulating through the bottom 20 as the reactor vessel 10 operates. The coolant may be borated demineralized water maintained at a relatively high pressure of approximately 2500 psia and a temperature of approximately 650 degrees Fahrenheit.

A reactor core 55 is disposed in the interior of the reactor vessel 10. The reactor core 55 comprises a plurality of nuclear fuel assemblies 57 containing the fissionable material. The fuel assemblies 57 include a plurality of vertically extending fuel rods (not shown) structurally bound together. A plurality of vertically extending thimble tubes (not shown) are selectively positioned within each fuel assembly 57 for receiving control rods which function to control the fission process. The thimble tubes are structurally bound together by a spider assembly forming a movable control rod cluster (not shown in FIG. 1).

A plurality of closure head openings 60 are formed through the top of closure head 50 for respectively receiving a plurality of generally tubular shaped control rod drive mechanism (CRDM) penetration tubes 70. Each penetration tube 70 is affixed to the closure head 50 by weldments 77. Each CRDM penetration tube 70 houses a control rod drive shaft (not shown) extending therethrough; the drive shaft engaging at least one movable control rod cluster.

A control rod drive mechanism (CRDM) 90 is connected to the penetration tube 70 for axially moving a drive rod 80 and thus the control rod cluster connected thereto. The CRDM comprises a generally tubular pressure housing 100, which may be type 304 stainless steel. An electromagnetic coil stack assembly 110 is attached to the pressure housing 100 for electromagnetically and axially moving the drive rod 80 as the coil stack assembly 110 is electrically energized. When the coil stack assemblies 110 are energized, the control rods are fully withdrawn from the core 55. When the coil stack assemblies 110 are deenergized, the control rods are fully inserted into the core 55. A rod position indicator (RPI) 120 is attached to the coil stack assembly 110 for monitoring the position of the control rods, as is well known in the art.

As the reactor vessel 10 operates, the coolant enters the bottom 20 and circulates therethrough generally in the direction of the arrows. As the coolant circulates through the bottom 20, it also circulates over the fuel assemblies 57 for assisting in the fission process and for removing the heat produced by fission of the fissionable material contained in the fuel assemblies 57. The coil stack assemblies 110 axially move the control rod clusters in and out of fuel assemblies 57 to suitably control the fission process therein. The heat, generated by the fuel assemblies 57, is ultimately transferred to a turbine-generator set for producing electricity in a manner well known in the art.

Figure 2:
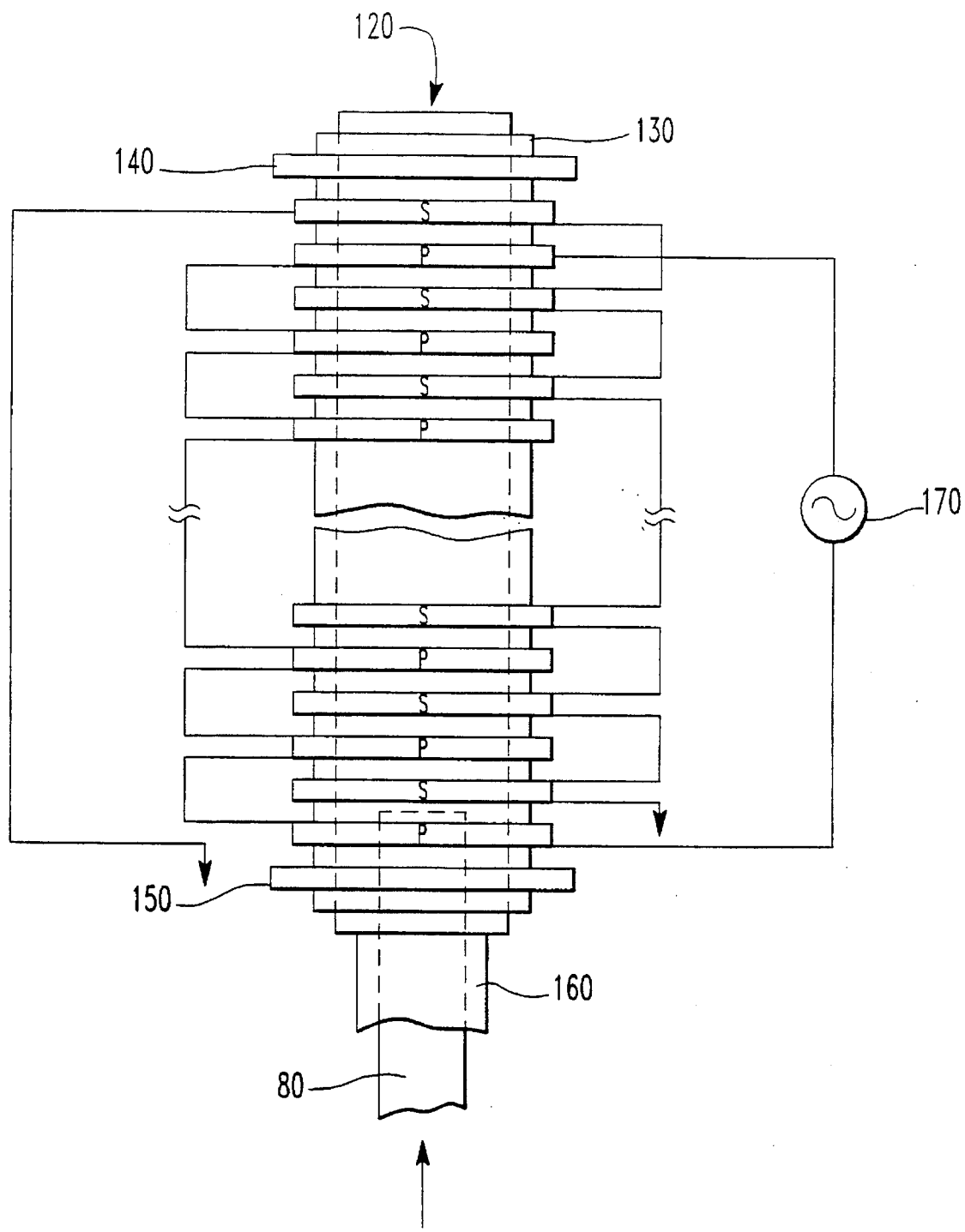
FIG. 2 illustrates a view in side elevation of a rod position indicator.

FIG. 2 illustrates a rod position indicator 120 of the linear voltage type with which the method and device of the present invention are particularly useful for compensating its output for variations due to the non-linearity when the control rods are substantially withdrawn. It should be understood that the present method is not restricted in application to the linear voltage transformer indicator but rather may be used with other types of rod position indicators, including the one described below which employs a single long winding, the resistance of which varies as a function of rod position.

The indicator 120 includes a plurality of annular, layered-wound primary coils P which are electrically connected in series to form a primary winding, and a plurality of annular, layered-wound secondary coils S which are electrically connected in series to form a secondary winding. The coils P and S are stacked in tandem and are mounted on a coil form 130 having end plates 140 and 150. The coil form 130 includes a thin nonmagnetic stainless steel tubular substructure that is slid over a nonmagnetic rod travel housing 160 which encloses the drive rod 80. The secondary coils S are alternatively interleaved and inductively coupled with the primary coils P, with a secondary coil S located at the top of the coil stack and a primary coil located at the bottom of the coil stack. A signal conditioning module 170 is connected to the primary for exciting a current in the primary winding which induces a voltage across terminals of the secondary winding. The signal conditioning module 170 will be described later in detail.

In one illustrative configuration, the coil form 130 is approximately 393.7 cm long with a combined primary and secondary active coil length of approximately 384.81 cm. The active coil includes layered-wound coils, half of which are primary coils P with the other half being secondary coils S alternatively interleaved as discussed above. Each coil is 13.72 cm in diameter and approximately 5.08 cm high. The primary coils P are essentially identical while the secondary coils S preferably have progressively more turns near the top and bottom of the detector to compensate the detector circuit path for the detector length. A space of approximately 7.62 cm exists between the lowest primary coil P and the bottom end plate 150 of the coil form 130.

The drive rod 80 is made of a metal having magnetic properties. As may be appreciated, as the drive rod 80 moves up through its housing, the coupling between the primary and secondary windings increases which causes a proportional increase in the magnitude of the voltage induced in the secondary winding. The secondary voltage thus also corresponds to the position of the control rod as it is withdrawn from the core 55 of the reactor vessel 10. While in theory the relationship between the secondary voltage and rod position should be linear, in fact there are a number of variables which introduce error into the output of the secondary winding. One such error is the non-linearity of the secondary voltage when the control rods are substantially withdrawn, particularly in the range of 220 to 231 steps where the magnetic coupling path is attenuated due to lack of extra detector coils. The system of the present invention includes a method and apparatus for compensating the rod position indication system for such non-linearity.

Figure 3:
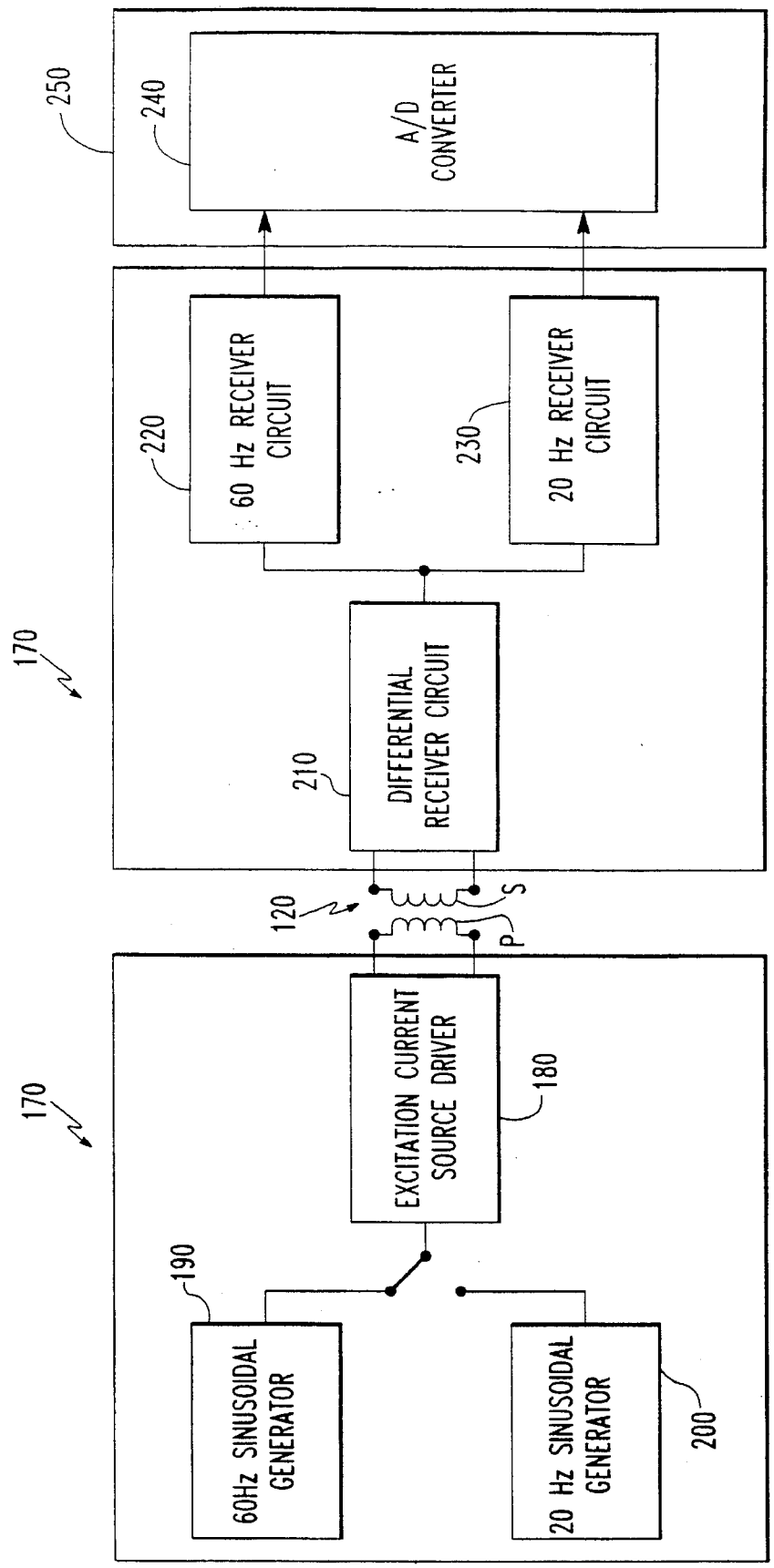
FIG. 3 illustrates a schematic diagram of a circuit of the present invention for compensation of the rod position indicator system for non-linearity.

FIG. 3 illustrates a circuit of the present invention for compensating for non-linearity in the secondary voltage of the rod position indicator 120. Although the circuits of the present invention are shown in block diagram form, it is well known by those skilled in the art of how to reconstruct the details of the circuitry. The signal conditioning module 170 includes an excitation current source driver 180 for providing the necessary current to drive the primary (P) of the rod position indicator 120. A sixty hertz sinusoidal generator 190 and a twenty hertz sinusoidal generator 200 are both electrically connected to the driver 180 for providing the desired frequency to the driver 180. The driver 180 may be switched between the generators 190 and 200 for changing the frequency of the current of which the driver 180 is supplying.

The secondary (S) of the rod position indicator 120 is also connected to another portion of the signal conditioning module 170 for receiving the output signal from the rod position indicator 120. This portion includes a differential receiver circuit 210 for eliminating any extraneous noise contained within the signal which is received from the secondary (S). A sixty hertz receiver circuit 220 and twenty hertz receiver circuit 230 both function to receive the processed signal from the differential receiver circuit 210. The sixty hertz receiver circuit 220 functions as a bandpass filter for signals having a frequency of approximately sixty hertz. Similarly, the twenty hertz receiver circuit 230 functions as a bandpass filter for signals having a frequency of approximately twenty hertz. As will be obvious to those skilled in the art, although both the sixty and twenty hertz receiver circuits 220 and 230 receive the signal from the differential receiver circuit 210, only one of the two will at any given time process the signal from the differential receiver circuit 210 and produce an output. If the received signal is approximately sixty hertz, the sixty hertz receiver circuit 220 will obviously process the signal and will have an output. If the received signal is approximately twenty hertz, the twenty hertz receiver circuit 230 will process the signal.

An analog to digital converter (A/D converter) 240 includes two input channels which are respectively connected to the receiver circuits 220 and 230 for receiving whichever of the two receiver circuits 220 and 230 is outputting its signal. The A/D converter 240 is contained within a computer 250 for taking the digital signal from the A/D converter 240 and processing it into a form suitable for readout, for example a display screen (not shown). This processing is well known in the art.

The present invention operates as illustrated below. When the rod position indicator 120 is monitoring the position of the control rods having a step range of 0 to 220 steps, the excitation current source driver 180 receives its frequency input from the sixty hertz sinusoidal generator 190, and outputs a current having a frequency of sixty hertz to the primary (P) of the rod position indicator 120. The differential receiver circuit 210 receives the secondary output of the rod position indicator 210, and removes any extraneous noise contained therein. Since the signal from the differential receiver circuit 210 is obviously at sixty hertz, the sixty hertz receiver circuit 220 will process this signal and pass it to the computer 250 as described above.

When the rod position indicator 120 is monitoring the position of the control rods having a step range of 221 to 231 steps, the excitation current source driver 180 switches its frequency input from the sixty hertz sinusoidal generator 200 to the twenty hertz sinusoidal generator 200, and outputs a current having a frequency of twenty hertz to the primary (P) of the rod position indicator 120. The differential receiver circuit 210 receives the secondary output of the rod position indicator 210, and again removes any extraneous noise contained therein. Since the signal from the differential receiver circuit 210 is at twenty hertz, the twenty hertz receiver circuit 230 will process this signal and pass it to the computer 250 for processing. It is instructive to note that the twenty hertz frequency is more sensitive to step changes in the range of 220 to 231 steps than the sixty hertz frequency, related to the number of magnetic flux linkages. At twenty hertz, there are fewer magnetic flux linkages from the primary coil to the secondary coil. Any changes in the linkages (due to rod position changes) are accentuated and are easier to detect and condition with the electronics described in this disclosure.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described merely a preferred or exemplary embodiment thereof.

We claim:

1. A method for compensating for the non-linearity of an LVDT-type sensor utilized to determine the position of each control rod of a control rod cluster assembly during selective step movement of each control rod into and out of a nuclear reactor core, comprising the steps of:

a) applying an excitation current of a first preselected frequency to a primary of said LVDT-type sensor for inducing at a secondary of said sensor a secondary voltage representative of the position of each control rod of said control rod cluster assembly relative to a fully inserted position within said reactor core so long as the relationship between said secondary voltage and the position of each control rod is a linear relationship; and b) switching the frequency of said excitation current to a second preselected frequency when the relationship between said secondary voltage and the position of each control rod becomes non-linear to restore said linear relationship.

2. The method as in claim 1, wherein said first preselected frequency is approximately 60 cycles.

3. The method as in claim 1, wherein said second preselected frequency is approximately 20 cycles.

4. The method as in claim 1, wherein said excitation current is applied at a first preselected frequency of 60 cycles during step movement of each said control rod of said control rod cluster assembly over a range of between approximately 0 and 220 steps.

5. The method as in claim 1, wherein said excitation current is applied at a second preselected frequency of 20 cycles during step movement of each said control rod of said control rod cluster assembly over a range of between approximately 221 and 231 steps.

6. An apparatus for compensating for the non-linearity of an LVDT-type sensor utilized to determine the position of each control rod of a control rod cluster assembly during selective step movement of the control rods into and out of a nuclear reactor core, comprising:

a) an LVDT-type sensor communicating electromagnetically with a control rod cluster assembly and operable to determine the position of each control rod of said control rod cluster assembly relative to a fully inserted position within said reactor core; and b) a signal conditioning module for applying an excitation current of a first preselected frequency to a primary of said LVDT-type sensor for inducing at a secondary of said sensor a secondary voltage representative of the position of each control rod of said control rod cluster assembly relative to a fully inserted position within said reactor core so long as the relationship between said secondary voltage and the position of each control rod is a linear relationship and including means for switching the frequency of said excitation current to a second preselected frequency when the relationship between said secondary voltage and the position of each control rod becomes non-linear to restore said linear relationship.

7. The apparatus as in claim 6, wherein said signal conditioning module includes a first frequency generator means for generating said first preselected frequency having a value of approximately 60 cycles and a second frequency generator means for generating said second preselected frequency having a value of approximately 20 cycles.

8. The apparatus as in claim 7, wherein said first frequency generator means generates said excitation current at a frequency of approximately 60 cycles during step movement of each said control rod of said control rod cluster assembly over a range of between approximately 0 and 220 steps and said second frequency generator means generates said excitation current at a frequency of approximately 20 cycles during step movement of each said control rod of said control rod cluster assembly over a range of between approximately 221 and 231 steps.

* * * * *